United States Patent [19]

Roba et al.

[11] Patent Number: 4,738,873
[45] Date of Patent: Apr. 19, 1988

[54] METHOD OF MAKING ALUMINA-DOPED SILICA OPTICAL FIBERS

[75] Inventors: Giacomo Roba, Cogoleto; Giuseppe Parisi, Turin, both of Italy

[73] Assignee: Cselt - Centro Studi E Laboratori Telecomunicazioni SpA, Turin, Italy

[21] Appl. No.: 845,565

[22] Filed: Mar. 28, 1986

[30] Foreign Application Priority Data

Apr. 10, 1985 [IT] Italy ............................... 67338 A/85

[51] Int. Cl.$^4$ ................................................ B05D 5/06
[52] U.S. Cl. ..................................... 427/163; 65/3.12; 427/255; 427/255.3
[58] Field of Search ............ 427/163, 167, 255, 255.3; 65/3.12

[56] References Cited

U.S. PATENT DOCUMENTS

| 3,306,768 | 2/1967 | Peterson | 427/255.3 |
| 3,511,703 | 5/1970 | Peterson | 427/255.3 |
| 3,957,474 | 5/1976 | Kobayashi et al. | 427/163 |
| 4,576,836 | 3/1986 | Colmet et al. | 427/255.3 |
| 4,592,924 | 6/1986 | Kuppers et al. | 427/255.3 |

OTHER PUBLICATIONS

"Fabrication of Low-Loss $Al_2O_3$ Doped Silica Fibers" by Y. Ohmoti et al., Electronics Letters, Sep. 2, 1982, vol. 18, No. 19, pp. 761-763.

Primary Examiner—Sadie L. Childs
Attorney, Agent, or Firm—Karl F. Ross; Herbert Dubno

[57] ABSTRACT

The method allows the production of silica and dopant with reactions among gaseous chemical compounds. The optical fibers produced do not present dip and exhibit low attenuation. Carbon dioxide is used as the oxidizer and organometallic aluminum compounds are used to obtain the dopant; silica is obtained from organometallic silicon compounds or silicon tetrachloride.

4 Claims, No Drawings

METHOD OF MAKING ALUMINA-DOPED SILICA OPTICAL FIBERS

CROSS REFERENCE TO RELATED APPLICATION

This application is related to the commonly owned copending application Ser. No. 779,081 corresponding to Italian patent application No. 68135-A/84 of Nov. 13, 1984 (now U.S. Pat. No. 4,657,575 issued Apr. 14, 1987).

FIELD OF THE INVENTION

Our present invention relates to the industrial manufacture of physical carriers for optical telecommunications systems and more particularly, it relates to a method of fabricating alumina-doped silica optical fibers using organometallic compounds.

BACKGROUND OF THE INVENTION

Germanium dioxide ($GeO_2$) is the dopant chiefly used in CVD (chemical vapor deposition) techniques for fabricating the optical fiber core, both in case of inside vapor deposition processes (IVPO) in which a tube is internally coated and then collapsed, and in case of outside processes (OVPO) in which a rod is coated.

In fact, $GeO_2$ gives with silica in the coating a binary network having a stable vitreous state. The halide source, germanium tetrachloride ($GeCl_4$), from which the $GeO_2$ can be obtained by oxidation is particularly suited for use in CVD techniques, since, at room temperature it is an easily vaporable liquid (melting temperature $T_m = -49.5°$ C.; boiling temperature $T_b = 84°$ C.).

The optical properties of germanium dioxide are particularly interesting: practically no dispersion at a wavelength of 1.74 $\mu$m; and an infrared absorption peak due to melecular vibration of Ge—O bond centered at a wavelength of about 12 $\mu$m.

The latter property prevents modifications of the silica spectral-attenuation curve, which has an infrared absorption peak for the molecular vibration of Si—O bond centered at a slightly lesser wavelength (9.1 $\mu$m).

For these reasons germanium dioxide is nowadays the most widely used compound in optical fiber technology and has generally been the only one used for fabricating the core of silica-based optical fibers.

It presents, however, two disadvantages:

(i) high cost of raw material; and
(ii) a Rayleigh scattering coefficient higher than that of pure silica, whose value is about 0.6 dB/km/ $m^4$.

The effect of germanium dioxide in the binary lattice structure $SiO_2$—$GeO_2$ is that of increasing the scattering coefficient value in proportion to the concentration of the dopant present in the network.

That is detrimental to performance because of a significant increase in minimum attenuation values.

Alumina ($Al_2O_3$) is an attractive alternative to $GeO_2$; in fact, in addition to having all the advantages of germanium dioxide, it presents the following characteristics:

(a) a Rayleigh scattering coefficient less than that of silica;
(b) lower cost of raw material; and
(c) high melting teperature.

It is of interest to underline the fact that a scattering coefficient lower than that of silica can allow the lowest attenuation levels to be reached for silica-based vitreous networks.

More particularly with vitreous networks using a $SiO_2$—$Al_2O_3$ core system a minimum attenuation value lower than that of silica can be obtained; for silica this value is equal to 0.12 dB/km in the wavelength range of about 1.56 m.

The high melting temperature is particularly advantageous.

The melting temperature of alumina (2045°) is higher than those of silica (1703° C.) and of germanium oxide (1086° C.). The physical properties of a $SiO_2$—$Al_2O_3$ lattice structure are hence closer to those of an $SiO_2$ lattice structure than those of an $SiO_2$—$GeO_2$ lattice structure.

In addition, the presence of a compound with higher melting point prevents the dopant diffusion towards the periphery during the preform collapsing step when the system is fabricated using an inside position method.

As a consequence, alumina-doped silica fibers fabricated by the MCVD technique do not present any dip (i.e. central refractive index decrease). This is a typical anomaly in the profile of germanium-dioxide doped silica fibers, fabricated by the same technique.

The main disadvantage preventing alumina from being industrially utilized as a dopant theretofore is that satisfactory liquid or gaseous compounds at room temperature, to be used as aluminum vehicles and hence suited to CVD techniques, are difficult to find.

Aluminum halides are solid at room temperature and have rather high boiling temperatures. For example, $AlF_3$ sublimes at 1291°, $AlCl_3$ sublimes at 178° C., $AlBr_3$ melts at 97° C. and boils at 263° C., $AlI_3$ melts at 191° C. and boils at 360° C. The use of CVD technique with such raw materials requires reactant mixing and vaporization lines thermostated at high temperature. That entails implementing difficulties and does not assure pollution-free synthesis products.

Besides, solid compounds at room temperature are more difficult to purify by comparison with liquid or gaseous compounds; hence they can contain residual impurities detrimental to optical properties.

The use of $AlCl_3$ as a basic aluminum vehicle has been already suggested in the paper entitled "Fabrication of Low-Loss $Al_2O_3$ doped silica fibers" by Y. Ohmori et al. Electronics letters, Sept. 2, 1982, Vol. 18, No. 18, without a solution of the problem.

A method of fabricating alumina-doped silica fibers has been reported in the previously mentioned Italian patent application No. 68135-A/84, filed on Nov. 13, 1984. In the system described there, silica and dopant are obtained by a reaction between gaseous chemical compounds, dopant being obtained by the reaction between oxygen and an organometallic compound of the $Al(C_\alpha H_\beta)_\zeta$ or of $AlCl(C_\alpha H_\beta)_\psi$ type, where $\alpha$, $\beta$, $\zeta$, $\psi$ are respectively coefficients of presence in molecules, of the atoms C, H and of the hydrocarbon respectively. The coefficients of presence are here defined as the number of atoms or moieties over molecule.

These organometallic compounds are liquid at room temperature; hence this method allows silica to be doped with alumina by using a Chemical-Vapor-Deposition technique (CVD) without requiring the use of vaporization and mixing lines thermostated at high temperature. The obtained optical fibers present low attenuation and are not affected with the dip.

However organometallic compounds are highly reactive with oxygen even at low temperature.

This is a drawback because the reaction, besides occurring spontaneously, proceeds rapidly to completion at high efficiency, thereby making control of the deposition phase of silica and alumina difficult.

In addition this high aluminum alkyl reactivity with oxygen presents serious problems concerning plant safety.

OBJECTS OF THE INVENTION

The object of our invention is to provide a method of making alumina-doped silica fibers which, by eliminating oxygen as an oxidizer, allows a better control of the reactions and of the following deposition phase while obviating the plant safety problems.

Another object is to extend the principles of the above-mentioned copending application.

SUMMARY OF THE INVENTION

These objects are attained in accordance with the present invention in a method of fabricating alumina-doped silica fibers, with silica and dopant obtained by the reaction among gaseous chemical compounds, including for obtaining the dopant, organometallic aluminum compounds, wherein carbon dioxide is used as an oxidizer, preferably the exclusive oxidizer in that reaction among gaseous chemical compounds.

The method of making silica fibers doped with alumina thus comprises:

reacting at least one gaseous silicon-containing compound and at least one gaseous organometallic aluminum-containing dopant-producing compound with carbon dioxide as an oxidizer to codeposit silica and alumina upon a silica-glass support to form a coated body (i.e. by either internal or external coating); and drawing optical fibers from said body. In the case of internal coating, the internally coated silica-glass tube forming the support is preferably first collapsed.

The silicon-containing compound can be an organometallic silicon compound easily vaporizable at room temperature and selected from the group of:

$Si(C_aH_b)_d$, $Si(C_aH_b)_eX_s$, and $Si(C_aH_b)_fO_t$, wherein X is halogen, a and b are numbers representing the number of atoms per hydrocarbon moiety, d and e are numbers representing the number of hydrocarbon moieties per molecule, and s and t are numbers representing the number of halogen and oxygen atoms per molecule.

Most preferably the silicon-containing compound is silicon tetrachloride and the silicon tetrachloride is reacted with carbon dioxide to yield the silica of the layer. The organometallic aluminum- containing dopant-producing can be selected from the group of:

$AlX_m(C_nH_{2n+1})_{3-m}$, and $Al(C_nH_{2n+1})_3$, wherein X is halogen and n and m are integers. More specifically the gaseous organometallic aluminum- containing dopant-producing compound is selected from the group of:
trimethylaluminum,
triethylaluminum,
dimethylaluminum chloride, and
diethylaluminum chloride.

Preferably the $CO_2$ is the sole oxidizer.

SPECIFIC DESCRIPTION AND EXAMPLES

Alumina to be used as silica dopant in a CVD process is obtained from oganometallic aluminum compounds, such as, e.g. Trimethylaluminum, Triethylaluminum, Dimethylaluminum chloride and Diethylaluminum chloride. The chemical formulae, melting temperatures $T_m$ and boiling temperatures $T_b$ of these four compounds are reported as follows:

| Compound | Formula | $T_m$ [°C.] | $T_b$ |
|---|---|---|---|
| Trimethylaluminum | $Al(CH_3)_3$ | 0 | 130 |
| Triethylaluminum | $Al(C_2H_5)_3$ | −50.5 | 194 |
| Dimethylaluminum chloride | $AlCl(CH_3)_2$ | −50 | 84 |
|  |  | (pressure 26.6 KPa) | |
| Diethylaluminum chloride | $AlCl(C_2H_5)_2$ | −50 | 126 |
|  |  | (pressure 8 KPa) | |

They are compounds either of $Al(C_nH_{2n+1})_3$ type, or of $AlX_m(C_nH_{2n+1})_{3-m}$ type, where X is a halogen and m the coefficients of presence in molecule of halogen atoms.

These compounds are liquid at room temperature and easily vaporizable.

Aluminum alkyls are easily decomposable at temperature higher than 300° C. into metal aluminum, olefine and hydrogen according to the following reactions.

$$2Al(C_nH_{2n+1})_3 \rightarrow 2Al + 3H_2 + 6C_nH_{2n}$$

$$2AlCl(C_nH_{2n+1})_2 \rightarrow 2Al + H_2 + 2HCl + 4C_nH_{2n}.$$

Afterwards, at temperatures used in MCVD process, the aluminum product can react with carbon dioxide as follows:

$$2Al + 3CO_2 \xrightarrow{1700° C.} Al_2O_3 + 3CO$$

Thus according to the present invention carbon dioxide $CO_2$ is used as the oxidizer, in place of oxygen $O_2$, in an MCVD process.

At temperatures used in MCVD techniques, of the order of 1700° C. to 1800° C., the reaction directly involved between the organometallic aluminum compound and carbon dioxide is of the following type.

$$2AlCl(CH_3)_2 + 12CO_2 \xrightarrow{1700° C.} Al_2O_3 + 16CO + 2HCl + 5H_2O$$

As silica forming compounds, according to a preferred embodiment of the present invention, organometallic silicon compounds of of $Si(C_\alpha H_\beta)_\zeta$, $Si(C_\alpha H_\beta)_\psi X_n$ type are used, where X is a halogen and $\alpha$, $\beta$, n, $\zeta$, $\psi$ are the coefficients of presence in molecule of atoms C, H, Halogen, and $C_\alpha H_\beta$ groups respectively.

These compounds can be either liquid or gaseous at room temperature and their chemical behavior is similar to the behavior of organometallic silicon compounds already examined: they can be e.g. Tetramethylsilicon, Dimethyldiethylsilicon, Tetraethylsilicon, Triethylsilicon chloride, Diethylsilicon dichloride, and Dimethylsilicon dichloride, which are liquid at room temperature.

The chemical formulae, and boiling temperatures $T_b$ of these compounds are reported as follows:

| Compound | $T_b \, [°C.]$ |
|---|---|
| $(CH_3)_4Si$ | 26.5 |
| $(CH_3)_2(C_2H_5)_2Si$ | 95.8 |
| $(C_2H_5)_4Si$ | 152.8 |
| $(C_2H_5)_3SiCl$ | 144 (pressure 98 KPa) |
| $(C_2H_5)_2SiCl_2$ | 129 |
| $(CH_3)_2SiCl_2$ | 70 |

The above-listed organometallic silicon compounds are more stable than aluminum compound, but at the temperatures used in MCVD techniques they also decompose (decomposition temperature higher than 600° C.).

As a consequence, by using $CO_2$ as an oxidizer, silicon and simple moleculae are obtained with a reaction behavior similar to that seen for alumina formation.

An example of the reaction of organometallic silicon compounds with $CO_2$ is given below:

$$(CH_3)_2SiCl_2 + 6CO_2 \rightarrow SiO_2 + 8CO + 2HCl + 2H_2O$$

For the vaporization of liquid reactants composed of organometallic aluminum and silicon compounds, inert gases such as Argon are used.

From the above-mentioned oxidation reactions at said temperatures, in addition to alumina and silica formation, simple moleculae are obtained such as e.g. water, carbon monoxide, and hydrogen chloride.

Carbon monoxide and hydrogen chloride are volatile compounds and are expelled with the main flow of reaction products and reactants which have not participated in the reaction. The water, if not removed by drying, could be incorporated in the lattice structure and cause optical absorption losses.

In case outside deposition processes are used (OVPO=Outside Vapor Phase Oxidation), such as e.g. OVD (Outside Vapor Deposition) and VAD (Vapor Axial Deposition), the water incorporated during the synthesis is expelled during yhe drying and a consolidating phase, after the deposition. Reaction products $CO_2$, HCl, $H_2$ are also typical products of basic reactions of these deposition techniques and hence do not give rise to pollution problems.

Using inside deposition techniques (IVPO) such as, e.g. MCVD technique (Modified Chemical Vapor Deposition) the obstacle can be overcome by a "soft", i.e. non-consolidated deposition, effecting then a layer by layer drying and consolidating of the deposit in presence of chlorine as a dehydrating agent.

This operation does not reduce the process productivity in case of monomode-fiber manufacture, as the number of layers necessary to core fabrication is quite limited. In all cases the collapsed tube structure or coated rod can be drawn by conventional techniques to optical fibers.

It is clear that what described has been given only by way of nonlimiting example. Variations and modifications are possible within the scope of the present invention and are included within the claimed invention.

More particularly, other organometallic compounds can be used to produce alumina and silica according to the following general formula:

$$Al(C_\alpha H_\beta)_\theta O_m, \, Si(C_\alpha H_\beta)_y O_m$$

where $\alpha$, $\beta$ and m are respectively the coefficients of presence in moleculea of atoms C, H and O; $\theta$, y are the coefficients of presence in moleculae of groups $C_\alpha H_\beta$. These compounds are liquid or gaseous at room temperature.

Silicon tetrachloride $SiCl_4$ can be used as a preferred silica forming compound, obtaining the following oxidation reaction:

$$SiCl_4 + 2CO_2 \xrightarrow{1700° C.} SiO_2 + 2Cl_2 + 2CO$$

However in the latter case in the conduit carrying the reactant vapors to the supporting tube used in MCVD techniques the following reaction between $SiCl_4$ and aluminum alkyl is possible:

$$3SiCl_4 + 4AlR_3 \rightarrow 3SiR_4 + 4AlCl_3$$

where R indicates an alkyl group such as e.g. $CH_3$; $CH_2-CH_3$ (methyl and ethyl).

Such a reaction can occur upstream of the zone where the main reaction occurs and could give rise to problems of deposition of $AlCl_3$ solid particles along the feeding line; this can be prevented by high reactant dilution with an inert gas (e.g. argon) so as to reduce to the minimum the above-cited reaction efficiency.

We claim:

1. A method of making silica fibers doped with alumina, comprising the steps of:
   providing a silica glass optical fiber preform as a support;
   reacting silicon tetrachloride or at least one gaseous organometallic silicon compound easily vaporizable at room temperature and at least one gaseous organometallic aluminum-containing dopant-producing compound selected from the group which consists of $Al(CH_3)_3$, $Al(C_2H_5)_3$, $AlCl(CH_3)_2$ and $AlCl(C_2H_5)_2$ with carbon dioxide as an oxidizer to codeposit by modified chemical vapor deposition silica and alumina upon said silica glass optical fiber preform support to form a coated body; and
   drawing optical fibers from said body.

2. The method defined in claim 1 wherein said silicon-containing compound is selected from the group which consists of:

$$Si(C_aH_b)_d,$$
$$Si(C_aH_b)_eX_s, \text{ and}$$
$$Si(C_aH_b)_fO_t,$$

wherein X is halogen, a and b are numbers representing the number of atoms per hydrocarbon moiety, d, e and f are numbers representing the number of hydrocarbon moieties per molecule, and s and t are numbers representing the number of halogen and oxygen atoms per molecule.

3. The method defined in claim 1 wherein said silicon-containing compound is silicon tetrachloride and the silicon tetrachloride is reacted with said carbon dioxide to yield the silica of said layer.

4. The method defined in claim 1 wherein $CO_2$ is the sole oxidizer of said compounds.

* * * * *